(No Model.)
E. D. MACKINTOSH.
SHAFT COUPLING.
No. 320,439. Patented June 16, 1885.
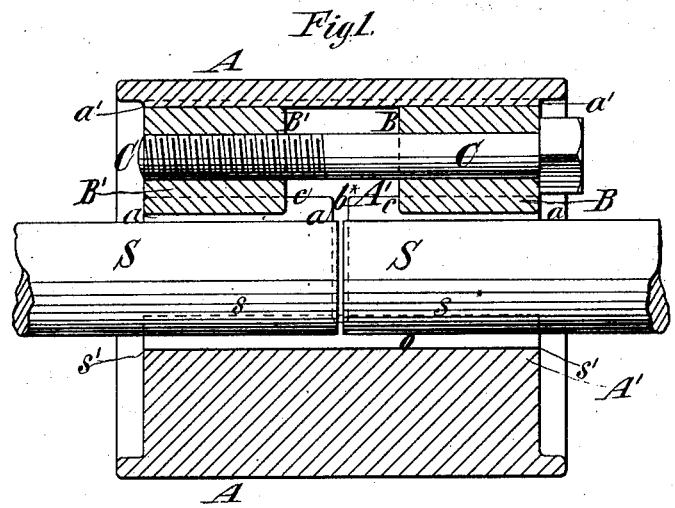
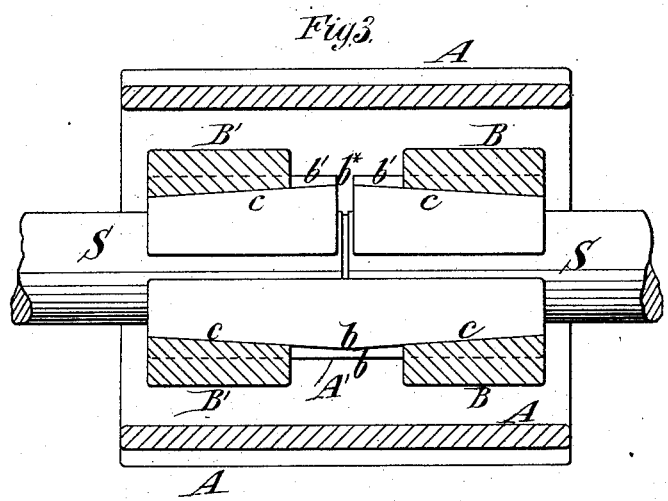
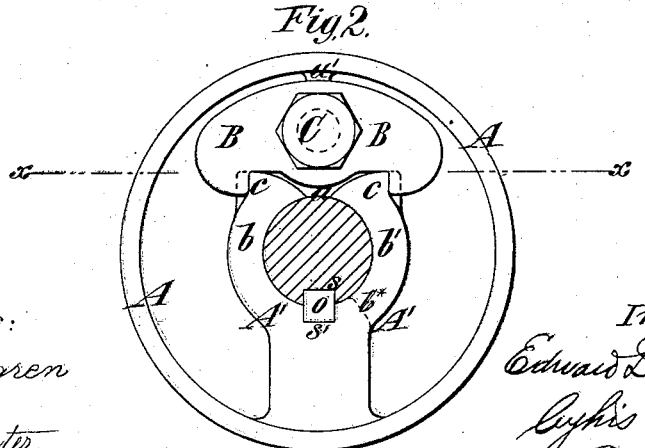
Witnesses:
C. E. Sundgren
Emil Herter
Inventor:
Edward D. Mackintosh
His Attys:
Brown & Hall

UNITED STATES PATENT OFFICE.

EDWARD D. MACKINTOSH, OF BROOKLYN, ASSIGNOR TO PAUL PRYIBIL, OF NEW YORK, N. Y.

SHAFT-COUPLINGS.

SPECIFICATION forming part of Letters Patent No. 320,439, dated June 16, 1885.

Application filed May 13, 1885. (No model.)

*To all whom it may concern:*

Be it known that I, EDWARD D. MACKINTOSH, of the city of Brooklyn, in the county of Kings and State of New York, have invented a certain new and useful Improvement in Shaft-Couplings, of which the following is a specification.

My invention relates to the couplings which are employed in joining together adjacent ends of pieces of shafting, and which are so constructed that they may be readily adjusted to so clamp the adjacent ends of two pieces of shafting that they will be coupled together and caused to rotate in unison as one continuous shaft.

The invention consists in the combination, with a longitudinally-divided clamp having adjacent projections on opposite sides of the line of division, of a yoke embracing said two projections, and operating with a wedge-like action when moved thereon in a direction lengthwise of the clamp to tighten the same upon the shaft. The clamp on one side of its line of division may be continuous from end to end, but it is preferably divided transversely on the other side of the line of longitudinal division, and two yokes are fitted to its projections on opposite sides of the transverse division, in order that the clamp may more effectively hold two shafts which may vary very slightly in diameter. The two yokes applied to the clamp from opposite ends thereof may be tightened upon it by means of a bolt inserted through them in a direction parallel with the axis of the clamp, or such bolt may pass through one yoke and be tapped or screwed into the other.

In the accompanying drawings, Figure 1 is a longitudinal section of a coupling embodying my invention and the two end portions of shafts coupled thereby. Fig. 2 represents an end view of the coupling and a transverse section of one of the shafts, and Fig. 3 is a longitudinal section upon the plane of the dotted line $x\ x$, Fig. 2.

Similar letters of reference designate corresponding parts in the several figures.

S S designate the adjacent end portions of shafting which are joined by my improved coupling. This coupling consists, essentially, of an external shell, A, which may be of cylindric form, a clamp, A', constructed within and formed in the same integral structure with the shell, and two yokes, B B'. These several parts may all be made of cast-iron, or the shell and clamp A A' only may be made of cast-iron, and the yokes B B' may be of wrought-iron or steel. The clamp A' is divided longitudinally at $a$, so as to form two portions or jaws, $b\ b'$, which, by drawing them together on each side of the line of division $a$, may be tightly clamped upon the shafts. Adjacent to the line of division $a$ are projections $c\ c$, to which are fitted the channeled or recessed faces of the yokes B B'. The outer faces or edges of these projections $c\ c$, which are at right angles to the plane of their outer ends, are divergent from each end of the coupling inward, as clearly shown in Fig. 3, and the inner faces of the jaws of the yokes B B' are correspondingly divergent or inclined, as also shown in Fig. 3; consequently it will be understood that when the yokes are moved from the ends of the coupling inward toward each other they will operate with a wedge-like action upon the projections $c\ c$, and will tend to draw together the projections which are on opposite sides of the line of division $a$, thereby tightening the clamp A' upon the shafts. This drawing together or inward of the yokes may be done in any suitable way.

I have here represented a bolt, C, inserted loosely through one yoke and having its end tapped or screwed into a thread in the other yoke. When this bolt is tightened, it will tend to move the yokes toward each other and to increase the clamping action of the coupling upon the shaft.

In lieu of having a bolt, C, inserted through one yoke and tapped into the other, a bolt might be inserted freely through both yokes and have a nut applied for drawing them together; but the tap-bolt here shown is deemed preferable, because after it has been loosened a number of turns a blow upon its head will drive outward the yoke B', and after that is removed the yoke B may be readily driven out by a tool put in from the opposite end of the coupling.

The two jaws $b\ b'$ of the clamp A' may be continuous throughout their length; but I have here represented one of the jaws, $b'$, as divided transversely of its length, as shown at $b^*$, thus enabling one end portion of the clamp to be tightened more or less than the other, and adapting the coupling for connecting shafts which vary slightly in their diameters.

I have here represented the shafts S as channeled or grooved slightly at $s\,s$, and the clamp is correspondingly grooved at $s'$, so as to receive a key or feather, $o$, whereby the coupling will be more securely locked to the two shafts. This key or feather may be omitted or employed, as may be desired, according to whether the power to be transmitted by the shaft is small or great.

I have here represented the shell A of the coupling as having upon its interior, at a point opposite the line of division $a$, a facing piece or strip, $a'$, whereby the yokes B B′ will be held in engagement with the projections $c\,c$.

Although I have here represented the outer sides of the projections $c\,c$ and the jaws of the yokes B B′ as correspondingly inclined, it is obvious that the same effect might be secured by forcing a straight yoke upon divergent projections, or by forcing an inclined or wedge-shaped yoke upon straight or parallel-sided projections. In either of these forms, however, the hold of the yoke upon the clamp would not be secured as it now is.

What I claim as my invention, and desire to secure by Letters Patent, is—

1. In a shaft-coupling, the combination, with a longitudinally-divided clamp having adjacent projections on opposite sides of its line of division, of a yoke fitted to the said projections and operating with a wedge-like action thereon for clamping the coupling upon shafts when moved in a direction lengthwise of the coupling, substantially as herein described.

2. In a shaft-coupling, the combination, with a longitudinally-divided clamp having adjacent projections on each side of its line of division, the outer or opposite edges of said projections being divergent from each end of the coupling inward, of yokes having their jaws or recesses correspondingly divergent and fitted to the said projections, and a bolt whereby said yokes may be drawn inward from opposite ends of the coupling or toward each other, in order to cause them to operate with a wedge-like action upon the projections of the clamp, substantially as herein described.

3. In a shaft-coupling, the combination, with a longitudinally-divided clamp, A′, having on opposite sides of its line of division projections $c$ the outer edges of which diverge from each end of the clamp inward, of yokes B B′, fitted to the said projections, and a tightening-bolt C, passing through one yoke and screwed or tapped into the other yoke, substantailly as herein described.

4. In a shaft coupling, the combination, with a longitudinally-divided clamp consisting of two jaws, one of which is divided transversely midway of the length of the clamp, and which have on opposite sides of the line of longitudinal division projections $c$, of yokes embracing said projections and operating with a wedge-like action thereon when moved lengthwise of the clamp, in order to tighten said clamp upon two adjacent shafts, substantially as herein described.

EDWARD D. MACKINTOSH.

Witnesses:
C. HALL,
FREDK. HAYNES.